US011531348B2

(12) United States Patent
Viswanathan (10) Patent No.: US 11,531,348 B2
(45) Date of Patent: Dec. 20, 2022

(54) METHOD AND APPARATUS FOR THE DETECTION AND LABELING OF FEATURES OF AN ENVIRONMENT THROUGH CONTEXTUAL CLUES

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 738 days.

(21) Appl. No.: 16/229,389

(22) Filed: Dec. 21, 2018

(65) Prior Publication Data

US 2020/0201344 A1  Jun. 25, 2020

(51) Int. Cl.
| | |
|---|---|
| G05D 1/02 | (2020.01) |
| G05D 1/00 | (2006.01) |
| G01C 21/32 | (2006.01) |
| G06V 20/10 | (2022.01) |
| G06V 20/58 | (2022.01) |
| G06V 20/56 | (2022.01) |

(52) U.S. Cl.
CPC ........ G05D 1/0221 (2013.01); G01C 21/32 (2013.01); G05D 1/0088 (2013.01); G05D 1/0274 (2013.01); G06V 20/182 (2022.01); G06V 20/584 (2022.01); G06V 20/588 (2022.01)

(58) Field of Classification Search
CPC .. G05D 1/0221; G05D 1/0274; G05D 1/0088; G06K 9/00651; G06K 9/00825; G06K 9/00798; G06K 9/00791; G01C 21/32; G01C 21/3852

USPC ......................................................... 701/23
See application file for complete search history.

(56) References Cited

U.S. PATENT DOCUMENTS

| 9,275,297 B2 * | 3/2016 | Tabb ................... G06K 9/4633 |
| 2017/0116477 A1 * | 4/2017 | Chen ................. G06K 9/00651 |

OTHER PUBLICATIONS

Pandit, V. et al., Automatic Road Network Extraction Using High Resolution Multi-Temporal Satellite Images,Conference Paper. Geoscience and Remote Sensing Symposium 2009 IEEInternational,vol. 5 (Aug. 2009) 4pages (Year: 2009).*
Wessl I.Context-SupportRoad Extraction From SARImagery: Transition From Rural to Built-Up Areas, [online] [retrieved Jan. 18, 2019],Retrieved from the Internet <URL: https://www.researchgate.net/publication/242585915_Context-supported_Road_Extraction fromSARImageryTransition-from _Rural toBuilt-up.*

(Continued)

*Primary Examiner* — Maceeh Anwari
(74) *Attorney, Agent, or Firm* — Alston & Bird LLP (57) ABSTRACT

Described herein are methods of detecting and labeling features within an image of an environment. Methods may include: receiving sensor data from an image sensor, where the sensor data is representative of a first image including an aerial view of a geographic region; detecting, using a perception module, at least one vehicle within the image of the geographic region; identifying an area around the at least one vehicle as a road segment in response to detecting the at least one vehicle; based on the identification of the area around the vehicle as a road segment, identifying features within the area as road features based on a context of the area; generating a map update for the road features of the road segment; and causing a map database to be updated with the road features of the road segment.

17 Claims, 5 Drawing Sheets

(56) References Cited

OTHER PUBLICATIONS

Hinz, S. et al., *Road Extraction in Urban Areas Supported by Context Objects*, International Archives of Photogrammetry and Remote Sensing, vol. XXXIII, Part B3, Amsterdam (2000) 405-412.

Hu, X. et al., *Automatic Road Extraction From Dense Urban Area by Integrated Processing of High Resolution Imagery and Lidar Data*, [online] [retrieved Jan. 18, 2019]. Retrieved from the Internet: <URL: https://pdfs.semanticscholar.org/2459/fd2e8d6383f0fae68c8e1866b-48524c35813.pdf>(dated 2004) 5 pages.

Pandit, V. et al., *Automatic Road Network Extraction Using High Resolution Multi-Temporal Statellite Images*, Conference Paper, Geoscience and Remote Sensing Symposium, 2009 IEEE International, vol. 5 (Aug. 2009) 4 pages.

Wessel, B. et al., *Context-Support Road Extraction From SAR Imagery: Transition From Rural to Built-Up Areas*, [online] [retrieved Jan. 18, 2019], Retrieved from the Internet: <URL: https://www.researchgate.net/publication/242585915_Context-supported_Road_Extraction_from_SAR_Imagery_Transition_from_Rural_to_Built-up_Areas>, (dated Oct. 16, 2015) 4 pages.

\* cited by examiner

METHOD AND APPARATUS FOR THE DETECTION AND LABELING OF FEATURES OF AN ENVIRONMENT THROUGH CONTEXTUAL CLUES

TECHNOLOGICAL FIELD

Example embodiments of the present invention relate generally to the detection and labeling of objects in an environment, and more particularly, to automatically identify features of an environment based on contextual clues.

BACKGROUND

Road geometry modelling is very useful for map creation and identification of features in environments, such as lane lines or road signs along a road segment. Such feature identification may facilitate autonomous vehicle navigation along a prescribed path. Traditional methods for modelling of road geometry and object or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

Some current methods for road geometry and environment modelling rely upon feature detection from image data to perform object identification, but these methods have deficiencies. For instance, some systems designed for object detection/identification around a vehicle exist, but may be unreliable. Further, the reliability of object and feature detection may not be known such that erroneous object detection or lack of object detection may adversely impact autonomous or semi-autonomous driving.

BRIEF SUMMARY

Accordingly, a method, apparatus, and computer program product are provided for automatically detecting and labeling of features in an environment, and more particularly, to automatically identify features of an environment based on contextual clues. In a first example embodiment, an apparatus is provided including at least one processor and at least one memory including computer program code. The at least one memory and the computer program code may be configured to, with the at least one processor, cause the apparatus to: receive sensor data from an image sensor, where the sensor data is representative of a first image including an aerial view of a geographic region; detect, using a perception module, at least one vehicle within the image of the geographic region; identify an area around the at least one vehicle as a road segment in response to detecting the at least one vehicle; based on the identification of the area around the vehicle as a road segment, identify features within the area as road features based on a context of the area; generate a map update for the road features of the road segment; and cause a map database to be updated with the road features of the road segment.

Causing the apparatus to detect, using the perception module at least one vehicle within the image of the geographic region may include causing the apparatus to identify at least one object within the image of the environment as a vehicle in response to the at least one object corresponding to a learned template of a vehicle. Causing the apparatus to identify an area around the at least one vehicle as a road segment in response to detecting the at least one vehicle may include causing the apparatus to: identify a location of the at least one vehicle; determine if a mapped road is within a predefined distance of the location of the at least one vehicle; and identify an area around the at least one vehicle as a road segment in response to detecting the at least one vehicle and the location of the at least one vehicle being within the predefined distance of a mapped road. The apparatus may be caused to provide for autonomous control of a vehicle based, at least in part, on the map update of the road features of the road segment.

The road features of the road segment may include information associated with driving restrictions along the road segment, where causing the apparatus to provide for autonomous control of the vehicle based, at least in part, on the map update may include causing the apparatus to provide autonomous control of the vehicle along the road segment based on the driving restrictions. The perception module may include an auto-encoder, where the auto-encoder may be trained based on a plurality of manually identified vehicles. Causing the apparatus to identify an around the at least one vehicle as a road segment may include causing the apparatus to: apply a dilation algorithm to probe and expand the area around the at least one vehicle in identifying the area as a road segment; and apply a spline-based curve fitting model to extract lane level geometry of the road segment.

Embodiments described herein may provide a computer program product including at least one non-transitory computer-readable storage medium having computer-executable program code instructions stored therein. The computer-executable program code instructions may include program code instructions to: receive sensor data from an image sensor, where the sensor data is representative of a first image including an aerial view of a geographic region; detect, using a perception module, at least one vehicle within the image of the geographic region; identify an area around the at least one vehicle as a road segment in response to detecting the at least one vehicle; based on the identification of the area around the vehicle as a road segment, identify features within the area as road features based on a context of the area; generate a map update for the road features of the road segment; and cause a map database to be updated with the road features of the road segment.

According to some embodiments, the program code instructions to detect, using the perception module, at least one vehicle within the image of the geographic region may include program code instructions to: identify at least one object within the image of the environment as a vehicle in response to the at least one object corresponding to a learned template of a vehicle. The program code instructions to identify an area around the at least one vehicle as a road segment in response to detecting the at least one vehicle may include program code instructions to: identify a location of the at least one vehicle; determine if a mapped road is within a predefined distance of the location of the at least one vehicle; and identify an area around the at least one vehicle as a road segment in response to detecting the at least one vehicle and the location of the at least one vehicle being within the predefined distance of a mapped road. The computer program product may include program code instructions to provide for autonomous control of a vehicle based, at least in part, on the map update of the road features of the road segment.

The road features of the road segment may include information associated with driving restrictions along the road segment. The program code instructions to provide for autonomous control of the vehicle based, at least in part, on the map update may include program code instructions to provide for autonomous control of the vehicle along the road segment based on the driving restrictions. The perception module may include an auto-encoder, where the auto-encoder is trained based on a plurality of manually identified vehicles. The program code instructions to identify an area around the at least one vehicle as a road segment may include program code instructions to: apply a dilation algorithm to probe and expand the area around the at least one vehicle in identifying the area as a road segment; and apply a spline-based curve fitting model to extract lane level geometry of the road segment.

Embodiments described herein may provide a method including: receiving sensor data from an image sensor, where the sensor data is representative of a first image including an aerial view of a geographic region; detecting, using a perception module, at least one vehicle within the image of the geographic region; identifying an area around the at least one vehicle as a road segment in response to detecting the at least one vehicle; based on the identification of the area around the vehicle as a road segment, identifying features within the area as road features based on a context of the area; generating a map update for the road features of the road segment; and causing a map database to be updated with the road features of the road segment. According to some embodiments, detecting, using the perception module, at least one vehicle within the image of the geographic region may include identifying at least one object within the image of the environment as a vehicle in response to the at least one object corresponding to a learned template of a vehicle.

According to some methods, identifying an area around the at least one vehicle as a road segment in response to detecting the at least one vehicle may include: identifying a location of the at least one vehicle; determining if a mapped road is within a predefined distance of the location of the at least one vehicle; and identifying an area around the at least one vehicle as a road segment in response to detecting the at least one vehicle and the location of the at least one vehicle being within the predefined distance of a mapped road. Methods may include providing for autonomous vehicle control of a vehicle based, at least in part, on the map update of the road features of the road segment. The road features of the road segment may include information associated with driving restrictions along the road segment, where providing for autonomous control of the vehicle based, at least in part, on the map update may include providing autonomous control of the vehicle along the road segment based on the driving restrictions. Identifying an area around the at least one vehicle as a road segment may include: applying a dilation algorithm to probe and expand the area around the at least one vehicle in identifying the area as a road segment; and applying a spline-based curve fitting model to extract lane level geometry of the road segment.

Embodiments described herein may provide an apparatus including: means for receiving sensor data from an image sensor, where the sensor data is representative of a first image including an aerial view of a geographic region; means for detecting, using a perception module, at least one vehicle within the image of the geographic region; means for identifying an area around the at least one vehicle as a road segment in response to detecting the at least one vehicle; based on the identification of the area around the vehicle as a road segment, means for identifying features within the area as road features based on a context of the area; means for generating a map update for the road features of the road segment; and means for causing a map database to be updated with the road features of the road segment. According to some embodiments, the means for detecting, using the perception module, at least one vehicle within the image of the geographic region may include means for identifying at least one object within the image of the environment as a vehicle in response to the at least one object corresponding to a learned template of a vehicle.

According to some embodiments, the means for identifying an area around the at least one vehicle as a road segment in response to detecting the at least one vehicle may include: means for identifying a location of the at least one vehicle; means for determining if a mapped road is within a predefined distance of the location of the at least one vehicle; and means for identifying an area around the at least one vehicle as a road segment in response to detecting the at least one vehicle and the location of the at least one vehicle being within the predefined distance of a mapped road. An apparatus may include means for providing for autonomous vehicle control of a vehicle based, at least in part, on the map update of the road features of the road segment. The road features of the road segment may include information associated with driving restrictions along the road segment, where the means for providing for autonomous control of the vehicle based, at least in part, on the map update may include means for providing autonomous control of the vehicle along the road segment based on the driving restrictions. The means for identifying an area around the at least one vehicle as a road segment may include: means for applying a dilation algorithm to probe and expand the area around the at least one vehicle in identifying the area as a road segment; and means for applying a spline-based curve fitting model to extract lane level geometry of the road segment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention to facilitate perception system training for automatically detecting features of an environment. In the context of mapping, objects or features of the environment may include roads, lane geometry, road signs, buildings, etc. Perception systems may detect these features and objects in an environment and understand the features and objects in the context of the environment. In order for a perception system to reliably detect features and objects, large volumes of training data may be collected from a data capture platform and objects and features of images of the environment may be positively identified in order for the perception system to understand how to identify objects and features of the environment. Conventionally, humans may perform the positive identification of objects and features as manual labelers of objects and features in the images. Such manual labeling may include identification and classification of objects within an image of an environment, together with providing an indication of a location of the objects within the image of the environment.

Embodiments of the present disclosure relate to automated feature detection in satellite imagery to augment the creation of high-definition (HD) maps, particularly in areas in which available map data is sparse. A segmented satellite image or image captured by an aerial vehicle from the overhead perspective may be used to invert lane geometry, road signs, etc., that are relevant features to the autonomous driving use case.

In order to automatically detect and segment features, such as regions that correspond to roads in a satellite or overhead image, large scale datasets may need to be hand-labeled and manually curated. The road section needs to be manually labeled at a pixel-level, resulting in a laborious and time consuming process. Once a dataset is curated, a segmentation method, typically implemented as a deep-learning network, may be used to identify regions that correspond to features such as roads in the satellite imagery. Embodiments described herein propose a method to simplify the labeling process and to bootstrap the segmentation scheme in order to improve the throughput of the data labelers and ultimately, the HD map constructed via segmented satellite data.

The automatic detection of features of an environment may further be complicated through learning data produced in one area, such as proximate a first city, is used to detect features in another region or city. For example, road segments in a first region may be exclusively asphalt, which is black in color, whereas another region may have roads that are substantially concrete, which is gray/white in color. Learning data generated from one region may be ineffective at detecting roads in another region, which may lead to incorrect labeling of features in the environment. Embodiments described herein avoid such issues through use of contextual cues that may be readily identified.

Figure 1:
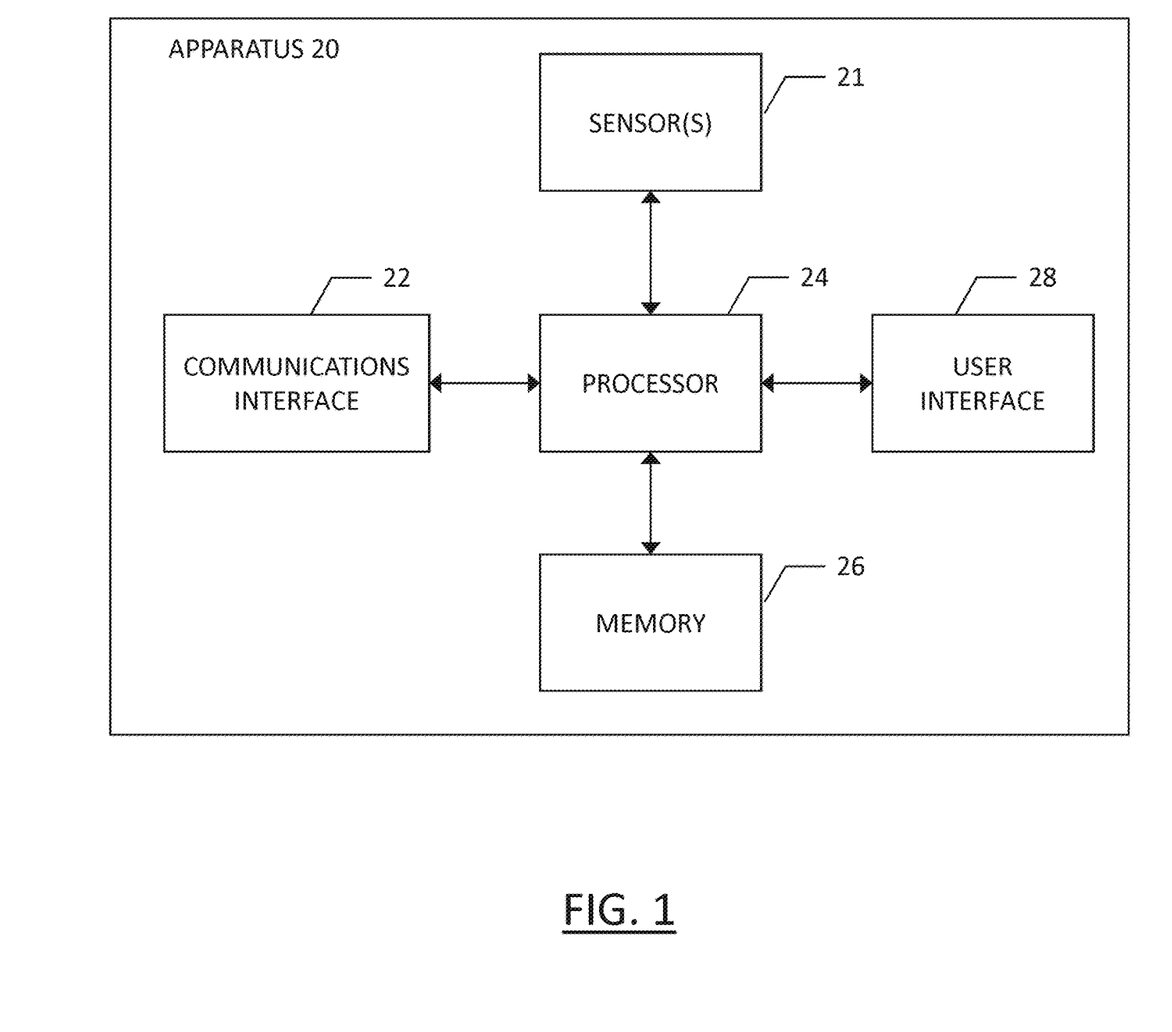
FIG. 1 is a block diagram of an apparatus according to an example embodiment of the present disclosure.

FIG. 1 is a schematic diagram of an example apparatus configured for performing some of the operations described herein and/or which may benefit from example embodiments of the present disclosure. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing object location using a perception system trained according to example embodiments described herein; however embodiments of the apparatus may be embodied or partially embodied as a mobile terminal, such as a personal digital assistant (PDA), mobile telephone, smart phone, personal navigation device, tablet computer, camera or any combination of the aforementioned systems. In an example embodiment for facilitating autonomous or partially autonomous vehicle control, the apparatus 20 may embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, locating signs and identifying information communicated by the sign, or any boundary related details of the road links that may be traversed by the vehicle.

Autonomous vehicles, or vehicles with some level of autonomous controls, provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data.

A perception system may be used to interpret the information gathered by the sensors of a vehicle, such as one or more image sensors, to identify objects and features of a roadway. The perception system may be trained through a neural network using training data that identifies objects and features to facilitate real-time identification of objects and features in an environment of the vehicle through the perception system. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle. Embodiments described herein may facilitate the building and updating of HD maps through the perception systems being able to reliably interpret features and objects of a mapped region, and providing that data to a map services provider.

Figure 2:
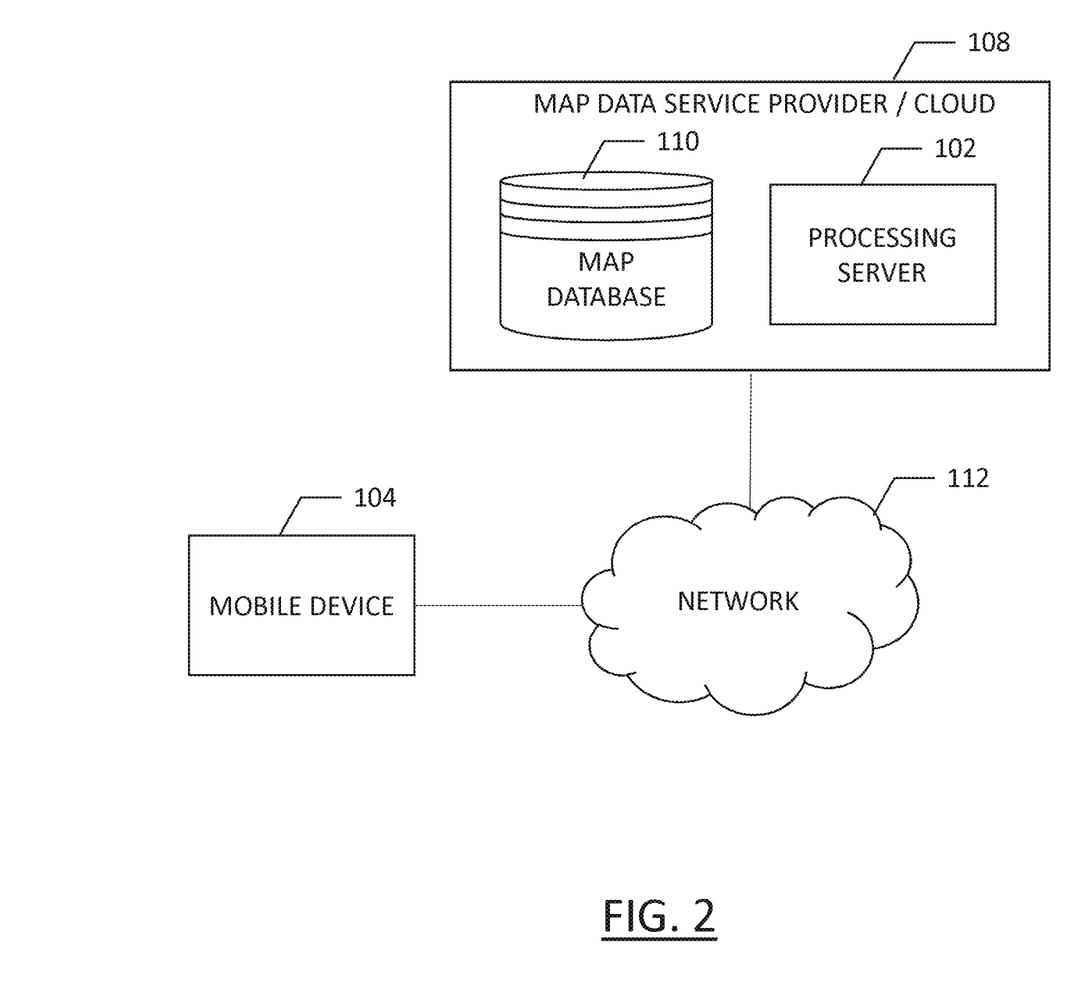
FIG. 2 is a block diagram of a system for detecting and labeling features within an image of an environment according to an example embodiment of the present disclosure.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example.

The map database 110 of example embodiments may be generated from a plurality of different sources of data. For example, municipalities or transportation departments may provide map data relating to road ways, while geographic information survey systems may provide information regarding areas beyond the road network. Satellite systems may be used to collect over-head bird's eye view images of a mapped region which may be used in conjunction with data from other sources. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to a several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based in part, on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment. HD maps may optionally be generated and updated based, at least in part, on satellite imagery that provides a bird's eye view of a region and may be used to identify objects and features of the mapped region.

Embodiments described herein may broadly relate to satellite imagery or overhead imagery (e.g., from drone or aircraft) when there is a need to establish the identification and position of an object or feature within an environment, as may be beneficial to the generation and confirmation of HD maps facilitating autonomous or semi-autonomous vehicle control. For example, objects and features along a road segment may be detected through processing of sensor data through a perception system. A perception system may discern objects and features within an environment and be capable of efficiently locating and classifying the objects according to the type of object. However, in order to efficiently locate and classify objects, a perception system may require training data from which object identification can be learned through a machine-learning technique in order to reliably and efficiently identify objects within an environment.

Training data for a perception system may be generated through initial image capture using, for example, satellites or aircraft, and objects within the images may be manually labeled to create a positive and definitive identification of objects within the image. However, in order to train a perception system, a large volume of training data may be needed. Generally, the more training data used, the more accurate the perception system will be. Embodiments described herein provide a method for automatically generating training data for road-segmentation in a fully automated process that requires minimal human labeling efforts.

Embodiments described herein estimate features of an environment within imagery captured from an overhead vantage point without requiring human labeling. An automated label generation process generates labels to identify features of an environment in order to facilitate HD map building, generation, and repair. The automated label generation process relies on identifying support structures or context cues within an environment that are visible to identify features of the image. These support structures or context cues may be, for example cars and/or trucks that are visible within an image. Embodiments rely on the context cues driving the object search that involves the identification of such vehicles within an environment. Identification of cars and/or trucks within an image provides a strong indicator that the area in which the vehicles are located is a drivable surface, and is potentially a roadway. While vehicles may be detected in parking lots or driveways, alignment of a location of a detected vehicle with a map, even if the alignment is rough and not of high precision, can discern between a vehicle that is traveling along a road segment versus a vehicle that is parked in a driveway. The self-supervised learning method described herein may then be used to automatically bootstrap the labeling process of the road segment after identifying image features that are determined to be a roadway.

Methods described herein automatically generate training data for feature segmentation in a fully automated process that requires minimal manual labeling by a human. In order to train a neural network for discerning features of an environment, training data may be automatically generated from substantially random sets of images captured through any available means. As examples described herein focus on the identification of features from an overhead perspective, the sets of images used may be satellite imagery and images captured by aircraft, such as drones or camera-equipped helicopters and airplanes. The training data that is selected should be representative of the typical domains in which the feature labeling is being performed. For example, images of roads and highways may be typical domains for use with autonomous vehicles and perception systems thereof.

Using context in the identification of features of an image of an environment enables features to be estimated based on other elements of the image that can be positively and repeatably identified. For example, vehicles typically drive on roads, and identifying vehicles within an image of an environment as described herein may be done consistently and efficiently. One example process of generating training data for the detection of objects such as vehicles can be implemented in which a human user identifies vehicles within an image by bounding the vehicles, such as by clicking and dragging a box around the found vehicles present in the image. The identified vehicles may each then be segmented from the image, resulting in a mask that may be applied to other regions in the satellite image. A single such labeled example can then be pasted against random satellite images to generate training data for a vehicle detector. This may be used as a vehicle-detection network that is trained to automatically detect vehicles present in overhead perspective images.

Vehicles are examples of objects within an image that may be repeatably identifiable due to relatively consistent shapes and sizes, particularly when viewed from the overhead perspective. For example, tractor-trailer combinations often have a box trailer that is of a standard fifty-three foot length and eight foot width, with a varying length tractor pulling the trailer. The identification of such an object may be relatively easy within an overhead view given relatively standard dimensions and a regular shape. Automobiles, such as cars, minivans, and pick-up trucks, may have less consistent dimensions, but remain relatively similar in width and have a general range of lengths. The identification of vehicles in images may be facilitated through training data in which vehicles are manually identified, and those manually identified vehicles provide templates for a machine learning neural network that becomes capable of automatic identification of vehicles. Vehicle templates may be relatively robust due to commonality in sizes and shapes, such that the volume of training data needed to accurately train a machine learning neural network on how to automatically identify vehicles may be relatively low as compared with the identification of other, less uniform objects.

According to example embodiments described herein, a satellite image or other overhead perspective may be captured and provided for feature identification. The image may be processed by a perception system, which may be embodied by processing server 102 of the map data service provider 108. The perception system, based on the neural network configuration, which may be embodied as an auto-encoder, identifies vehicles within the image. The identification of vehicles in the image provides context cues for the system described herein, as the identification of vehicles suggests that the location of the vehicles are roadways. Embodiments described herein operate under the assumption that the immediate vicinity of the vehicle is a drivable surface, whether it is paved, concrete, gravel, dirt, etc. As such, pixels within a neighborhood of the vehicle are labeled as road regions in the satellite image. Such regions may then be cropped and fed to another segmentation network that learns to segment out the full road from a single input comprising such detected vehicles. A standard dilation algorithm, followed by a spline-based curve fitting model, can be used to extract the lane-level geometry.

Figure 3:
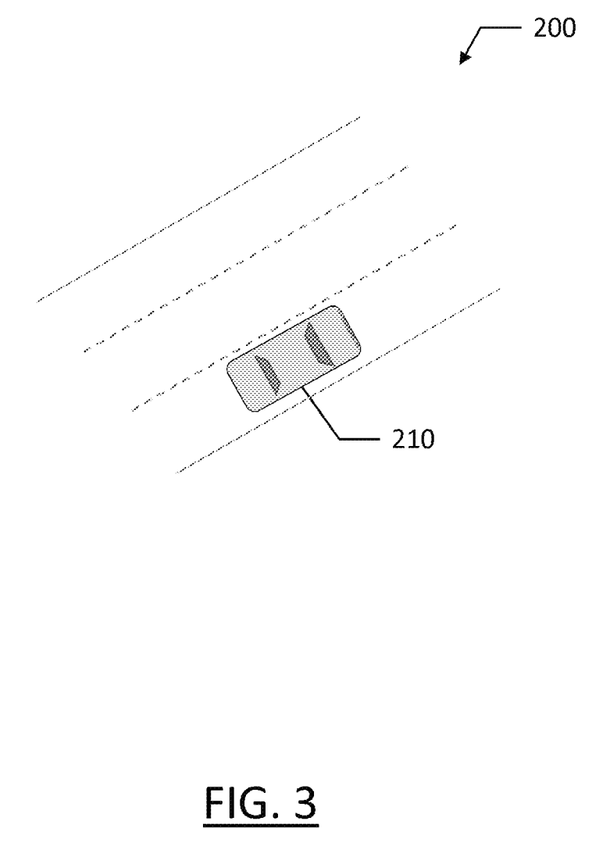
FIG. 3 illustrates the detection of a context cue in an image of an environment according to an example embodiment of the present disclosure.

FIG. 3 depicts an example embodiment in which a roadway is identified in a satellite or overhead image. As shown in FIG. 3, a portion of a satellite image 200 is analyzed with the perception module. A vehicle 210 is detected in the satellite image based on the training data that informs the perception module with respect to objects that correspond to vehicles. Based on the vehicle being identified as a context cue in the image 200, embodiments described herein predict the immediate vicinity of the vehicle 210 to be a road/drivable segment.

Figure 4:
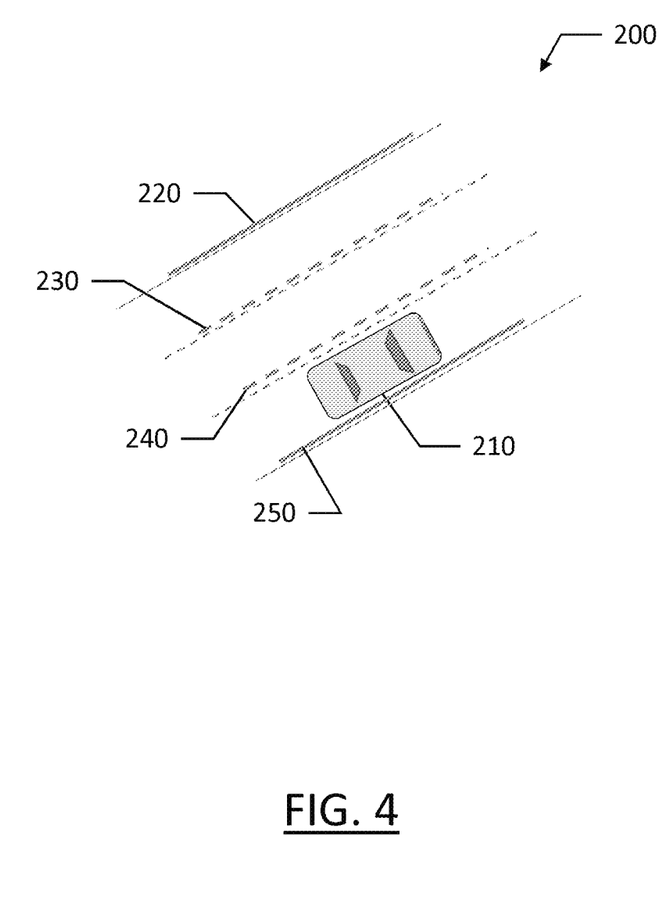
FIG. 4 illustrates the detection of features based on the context cue in an image of an environment according to an example embodiment of the present disclosure.

The area in the immediate vicinity of the detected vehicle 210 may then be analyzed under the presumption that the area is a road segment. This analysis may include an auto-encoder network that identifies road features based on the presumption that the identified area is a road segment. Such road features may include lane lines, road signs, or other features specific to roadways. FIG. 4 illustrates the features detected through the process described herein in which the vehicle 210, identified by the perception module using machine learning, indicates that the area immediately around the vehicle is a roadway. As it is established that the vehicle 210 is in a roadway, roadway specific features are sought. The perception module of the illustrated embodiment detects lane lines 220, 230, 240, and 250 given that the lines are identified within the context of a roadway. This enables the perception module to identify the lane lines with considerably greater certainty knowing that the area around the vehicle is a roadway. Further, embodiments of the perception system may classify feature types, such as classifying lane line 220 and 250 as solid lines, where lane line 220 may be a solid yellow line while line 250 may be a solid white line. Further, lines 230 and 240 may be identified as broken or dashed lane lines.

According to some embodiments, the identification of a road/drivable segment in the immediate vicinity of a vehicle may not only detect the vehicle, but may correlate a location of the detected vehicle object with a map of a road network of the region in which the vehicle object was located. If the vehicle location does not correspond to the location of a road segment within a predetermined distance, the vehicle object may be presumed to be on a non-drivable area or private area in which drivers are not generally allowed. Such an area may be in a driveway, or parked near a house or business, for example.

While the aforementioned example embodiments relate to the detection of vehicles as context cues, it is appreciated that a variety of context cues can be used to identify a variety of features in an environment. For example, embodiments may be configured to detect bicycles from above using learning data of identified bicycles, which typically have a similar profile when viewed from above from which templates of bicycles are readily generated for use as training data in a perception system. The identification of bicycles may inform embodiments of the present disclosure that the area proximate the identified bicycles is a bicycle-friendly environment. Further, the absence of vehicles in the areas proximate bicycles may indicate that the areas proximate the bicycles are bicycle/pedestrian only paths, where vehicles may be prohibited. Similarly, embodiments may be configured to identify pedestrians from an overhead perspective, such that the identification of pedestrians suggests a pedestrian-friendly environment which may be a sidewalk, pedestrian only path, or the like.

Embodiments described herein may broadly relate to automatic map data generation when there is a need to establish the identification and position of a feature within an environment, as may be beneficial to the generation and confirmation of HD maps facilitating autonomous or semi-autonomous vehicle control. For example, features of a road segment may be detected through processing of sensor data through a perception system as described above. A perception system may discern objects and features within an environment and be capable of efficiently locating and classifying the features according to the type of feature, such as a lane line or lane line type.

As described above, HD maps may be instrumental in facilitating autonomous vehicle control. Building the HD maps may rely on satellite imagery or data or data/imagery captured from a bird's-eye perspective. The sensor data that is received is processed to identify objects and features in the sensor data to properly build and update the HD maps, and to facilitate autonomous control of a vehicle within the mapped region. Certain features within the satellite/aerial imagery may be critical for facilitating autonomous control of a vehicle, such as roadway boundaries, lane lines, road signs, etc. Detecting these features reliably and repeatably may be instrumental in safe autonomous vehicle control.

Figure 5:
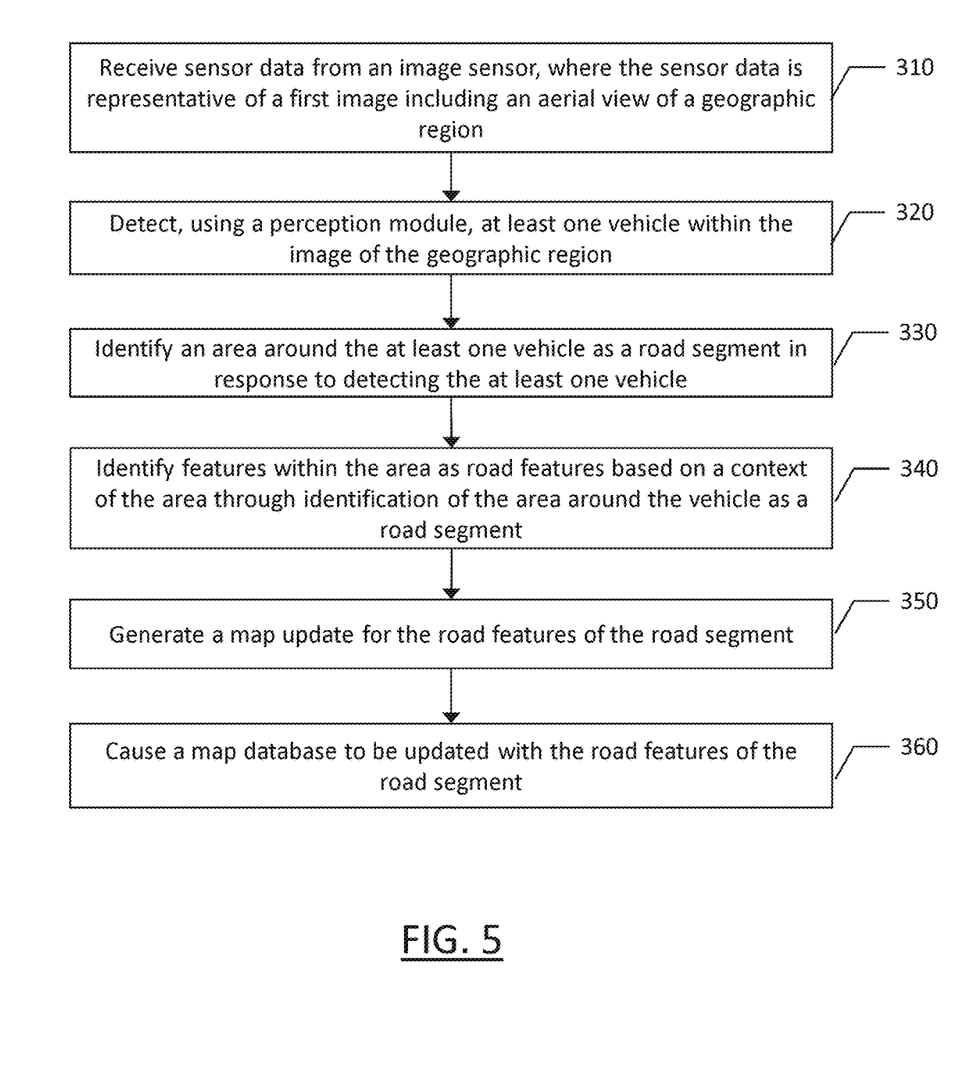
FIG. 5 is a flowchart of operations for detecting and labeling features within an image of an environment according to an example embodiment of the present disclosure.

FIG. 5 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 is a flowchart of a method for automatically detecting and labeling of features in an environment, and more particularly, to automatically identify features of an environment based on contextual clues. As shown at 310, sensor data is received from an image sensor, where the sensor data is representative of a first image including an aerial view of a geographic region. This image may be captured, for example, by a satellite, drone, or other aircraft of a bird's-eye view of a region. At 320, at least one vehicle within the image of the geographic region is detected through use of a perception module, which may be embodied by the processing server 102 of FIG. 2, for example. An area is identified at 330 of an area around the at least one vehicle as a road segment in response to detecting the at least one vehicle. Features within the area are identified at 340 as road features based on a context of the area through identification of the area around the vehicle as a road segment. A map update may be generated at 350 for the road features of the road segment, and a map database may be updated with the road features of the road segment at 360.

In an example embodiment, an apparatus for performing the method of FIG. 5 above may comprise a processor (e.g., the processor 24) configured to perform some or each of the operations (310-360) described above. The processor may, for example, be configured to perform the operations (310-360) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-360 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to facilitate autonomous or semi-autonomous control of a vehicle comprising at least one processor and at least one non-transitory memory including computer program code instructions, the computer program code instructions configured to, when executed, cause the apparatus to at least:
receive sensor data from an image sensor, wherein the sensor data is representative of a first image including an aerial view of a geographic region;
detect, using a perception module, at least one vehicle within the image of the geographic region;
identify a location of the at least one vehicle;
determine, from map data, that a mapped road is within a predefined distance of the location of the at least one vehicle;
identify an area around the at least one vehicle as a road segment in response to detecting the at least one vehicle and the location of the at least one vehicle being within the predefined distance of the mapped road;
based on the identification of the area around the vehicle as a road segment, identify features within the area as road features based on a context of the area, wherein road features comprise one or more of road signs, lane lines, or road boundaries;
generate a map update for the road features of the road segment; and
cause a map database to be updated with the road features of the road segment.

2. The apparatus of claim 1, wherein causing the apparatus to detect, using the perception module, at least one vehicle within the image of the geographic region comprises causing the apparatus to:
identify at least one object within the image of the environment as a vehicle in response to the at least one object corresponding to a learned template of a vehicle.

3. The apparatus of claim 1, wherein the apparatus is further caused to:
provide for autonomous control of a vehicle based, at least in part, on the map update of the road features of the road segment.

4. The apparatus of claim 3, wherein the road features of the road segment comprise information associated with driving restrictions along the road segment, wherein causing the apparatus to provide for autonomous control of the vehicle based, at least in part, on the map update comprises causing the apparatus to provide autonomous control of the vehicle along the road segment based on the driving restrictions.

5. The apparatus of claim 1, wherein the perception module comprises an auto-encoder, wherein the auto-encoder is trained based on a plurality of manually identified vehicles.

6. The apparatus of claim 1, wherein causing the apparatus to identify an area around the at least one vehicle as a road segment comprises causing the apparatus to:
apply a dilation algorithm to probe and expand the area around the at least one vehicle in identifying the area as a road segment; and
apply a spline-based curve fitting model to extract lane level geometry of the road segment.

7. A computer program product comprising at least one non-transitory computer-readable storage medium having computer-executable program code instructions stored therein, the computer-executable program code instructions comprising program code instructions to:
receive sensor data from an image sensor, wherein the sensor data is representative of a first image including an aerial view of a geographic region;
detect, using a perception module, at least one vehicle within the image of the geographic region;
identify a location of the at least one vehicle;
determine, from map data, that a mapped road is within a predefined distance of the location of the at least one vehicle;
identify an area around the at least one vehicle as a road segment in response to detecting the at least one vehicle and the location of the at least one vehicle being within the predefined distance of the mapped road;
based on the identification of the area around the vehicle as a road segment, identify features within the area as road features based on a context of the area, wherein road features comprise one or more of road signs, lane lines, or road boundaries;
generate a map update for the road features of the road segment; and
cause a map database to be updated with the road features of the road segment.

8. The computer program product of claim 7, wherein the program code instructions to detect, using the perception module, at least one vehicle within the image of the geographic region comprises program code instructions to:
identify at least one object within the image of the environment as a vehicle in response to the at least one object corresponding to a learned template of a vehicle.

9. The computer program product of claim 7, further comprising program code instructions to:
provide for autonomous control of a vehicle based, at least in part, on the map update of the road features of the road segment.

10. The computer program product of claim 9, wherein the road features of the road segment comprise information associated with driving restrictions along the road segment, wherein the program code instructions to provide for autonomous control of the vehicle based, at least in part, on the map update comprises program code instructions to provide autonomous control of the vehicle along the road segment based on the driving restrictions.

11. The computer program product of claim 7, wherein the perception module comprises an auto-encoder, wherein the auto-encoder is trained based on a plurality of manually identified vehicles.

12. The computer program product of claim 7, wherein the program code instructions to identify an area around the at least one vehicle as a road segment comprises program code instructions to:
   apply a dilation algorithm to probe and expand the area around the at least one vehicle in identifying the area as a road segment; and
   apply a spline-based curve fitting model to extract lane level geometry of the road segment.

13. A method comprising:
   receiving sensor data from an image sensor, wherein the sensor data is representative of a first image including an aerial view of a geographic region;
   detecting, using a perception module, at least one vehicle within the image of the geographic region;
   identifying a location of the at least one vehicle;
   determining, from map data, that a mapped road is within a predefined distance of the location of the at least one vehicle;
   identifying an area around the at least one vehicle as a road segment in response to detecting the at least one vehicle and the location of the at least one vehicle being within the predefined distance of the mapped road;
   based on the identification of the area around the vehicle as a road segment, identifying features within the area as road features based on a context of the area, wherein road features comprise one or more of road signs, lane lines, or road boundaries;
   generating a map update for the road features of the road segment; and
   causing a map database to be updated with the road features of the road segment.

14. The method of claim 13, wherein detecting, using the perception module, at least one vehicle within the image of the geographic region comprises:
   identifying at least one object within the image of the environment as a vehicle in response to the at least one object corresponding to a learned template of a vehicle.

15. The method of claim 13, further comprising:
   providing for autonomous control of a vehicle based, at least in part, on the map update of the road features of the road segment.

16. The method of claim 15, wherein the road features of the road segment comprise information associated with driving restrictions along the road segment, wherein providing for autonomous control of the vehicle based, at least in part, on the map update comprises providing autonomous control of the vehicle along the road segment based on the driving restrictions.

17. The method of claim 13, wherein identifying an area around the at least one vehicle as a road segment comprises:
   applying a dilation algorithm to probe and expand the area around the at least one vehicle in identifying the area as a road segment; and
   applying a spline-based curve fitting model to extract lane level geometry of the road segment.

* * * * *